(12) United States Patent
Vorsin (10) Patent No.: US 10,710,714 B2
(45) Date of Patent: Jul. 14, 2020

(54) AUTONOMOUS FLIGHT VEHICLE CAPABLE OF FIXED WING FLIGHT AND ROTARY WING FLIGHT

(71) Applicant: SkyX Limited, Markham (CA)

(72) Inventor: David Vorsin, Vaughan (CA)

(73) Assignee: SkyX Limited, Markham, CA (US)

( * ) Notice: Subject to any disclaimer, the term of this patent is extended or adjusted under 35 U.S.C. 154(b) by 390 days.

(21) Appl. No.: 15/608,324

(22) Filed: May 30, 2017

(65) Prior Publication Data

US 2018/0290743 A1    Oct. 11, 2018

(30) Foreign Application Priority Data

Apr. 7, 2017   (CA) ...................................... 2963662

(51) Int. Cl.
| | | |
|---|---|---|
| *B64C 29/02* | (2006.01) | |
| *B60L 53/12* | (2019.01) | |
| *B60L 50/50* | (2019.01) | |
| *B64C 39/02* | (2006.01) | |
| *G05D 1/00* | (2006.01) | |

(52) U.S. Cl.
CPC .............. *B64C 29/02* (2013.01); *B60L 50/50* (2019.02); *B60L 53/12* (2019.02); *B64C 39/024* (2013.01); *G05D 1/0088* (2013.01); *B60L 2200/10* (2013.01); *B60L 2260/32* (2013.01); *B64C 2201/021* (2013.01); *B64C 2201/104* (2013.01); *B64C 2201/108* (2013.01); *Y02T 10/7005* (2013.01)

(58) Field of Classification Search
CPC ... B64C 29/02; B64C 39/08; B64C 2201/042; B64C 2201/066; B64C 2201/104; B64C 2201/108; B64C 2201/165; B64D 27/24
See application file for complete search history.

(56) References Cited

U.S. PATENT DOCUMENTS

| | | | |
|---|---|---|---|
| 5,264,776 A * | 11/1993 | Hulsey | .................. B60L 3/0069 320/108 |
| 7,204,453 B2 | 4/2007 | Muren | |
| 8,511,606 B1 | 8/2013 | Lutke | |
| 2010/0301168 A1* | 12/2010 | Raposo | .................. A63H 23/00 244/171.2 |
| 2012/0187238 A1* | 7/2012 | Lam | ....................... A63H 27/12 244/17.21 |

(Continued)

FOREIGN PATENT DOCUMENTS

| | | |
|---|---|---|
| CA | 2929254 | 11/2017 |
| WO | 2016013933 | 1/2016 |

OTHER PUBLICATIONS

International Search Report for corresponding PCT No. PCT/CA2018/050435 dated Jun. 11, 2018.

*Primary Examiner* — Nicholas McFall
*Assistant Examiner* — Terri L Filosi
(74) *Attorney, Agent, or Firm* — Fay Sharpe LLP (57) ABSTRACT

An autonomous flight vehicle capable of both rotary wing flight and fixed wing flight may include a pair of rotary wing flight thrusters used during rotary wing flight and a smaller pair of hybrid flight thrusters used during both rotary wing flight and fixed wing flight. The larger rotary wing flight thrusters are skewed at an angle to reduce an apparent torque and improve the controllability of the autonomous flight vehicle, while using smaller, and so more efficient, thrusters during fixed wing flight.

14 Claims, 10 Drawing Sheets

(56) References Cited

U.S. PATENT DOCUMENTS

2012/0248259 A1    10/2012  Page
2016/0122018 A1*  5/2016  Matsue ................. B64C 39/024
                                                                     244/17.13
2016/0311329 A1*  10/2016  Rodriguez ............ B60L 11/182
2017/0217585 A1*  8/2017  Hulsman ............... B64C 39/024
2017/0369169 A1*  12/2017  Lee .......................... B64D 5/00

* cited by examiner

AUTONOMOUS FLIGHT VEHICLE CAPABLE OF FIXED WING FLIGHT AND ROTARY WING FLIGHT

This application claims priority to commonly owned, co-pending Canadian Patent Application No. 2,963,662, filed Apr. 7, 2017, by SkyX Limited and entitled "AUTONOMOUS FLIGHT VEHICLE CAPABLE OF FIXED WING FLIGHT AND ROTARY WING FLIGHT", the disclosure of which is incorporated herein by reference in its entirety.

TECHNICAL FIELD

The current disclosure relates to autonomous flight vehicles and in particular to autonomous flight vehicles that are capable of fixed-wing flight, rotary wing flight, and vertical takeoffs and landings.

BACKGROUND

Autonomous flight vehicles, which may also be referred to as drones, are capable of flying without direct control of an operator, although direct control is possible. The autonomous flight vehicles may be flown to capture data, such as images, of an area.

Autonomous flight vehicles may be capable of fixed wing flight using lift generating wings. Additionally, autonomous flight vehicles may also be capable of rotary wing flight using lift generating propellers or other rotating wing-like structures. Autonomous flight vehicles may use the rotary wing flight mode for takeoffs, landings, and surveying tasks and may transition to the fixed wing flight mode for increased range and endurance compared to the rotary wing flight mode.

Autonomous flight vehicles may be powered by rechargeable battery packs or by other power sources. Regardless of the power source, improved efficiency of the autonomous flight vehicle may provide an extended range and/or endurance that may be beneficial for various applications.

SUMMARY

In accordance with the present disclosure there is provided a flight vehicle capable of rotary wing flight and fixed wing flight, the flight vehicle comprising: a fixed wing structure configured to generate lift during fixed wing flight of the flight vehicle; a pair of combined flight thrusters mounted on opposites sides of a central portion of the fixed wing structure and configured to generate thrust during both fixed wing flight and rotary wing flight, rotational axes of each of the fixed wing flight thrusters lying within a first plane; and a pair of rotary wing flight thrusters, each of the rotary wing flight thrusters skewed at an angle away from a second plane perpendicular to the first plane, the pair of rotary wing flight thrusters configured for providing thrust during rotary wing flight, the pair of rotary wing flight thrusters capable of providing greater thrust than the pair of combined flight thrusters.

In a further embodiment of the flight vehicle, the fixed wing structure is symmetrical about the central portion in the shape of the aerodynamic surfaces and comprises: a central body; a first wing connected to a first side of the central body; and a second wing connected to a second side of the central body.

In a further embodiment, the flight vehicle further comprises a rudder extending perpendicularly away from each side of the central body, wherein each of rotary wing flight thrusters are mounted at respective ends of the rudder.

In a further embodiment of the flight vehicle, each of the first wing, second wing and rudder are removably connected to the central body.

In a further embodiment, the flight vehicle further comprises support points located on the wing structure and the rudder for supporting the flight vehicle for take-offs and landings.

In a further embodiment of the flight vehicle, each of the pair of combined flight thrusters comprise respective motors and propellers for generating the required thrust and each of the pair of rotary wing flight thrusters comprise respective motors and propellers for generating the required thrust.

In a further embodiment of the flight vehicle, propellers of the rotary wing flight thrusters motors are pivotally connected to the respective motors to allow the propellers to fold toward the motors during fixed wing flight.

In a further embodiment, the flight vehicle further comprises flight control electronics for autonomously controlling flight of the flight vehicle.

In a further embodiment, the flight vehicle further comprises one or more onboard sensors for capturing data during fixed wing flight.

In a further embodiment of the flight vehicle, all of the combined flight thrusters and rotary wing flight thrusters are battery-powered.

In a further embodiment, the flight vehicle further comprises: a rechargeable battery pack; and charging circuitry for re-charging the rechargeable battery pack.

In a further embodiment of the flight vehicle, the charging circuitry comprises an inductive charging coil.

In a further embodiment of the flight vehicle, the inductive charging coil is pivotally mounted to the fixed wing structure to allow the charging coil to move between a charging position parallel to a landing surface on which the flight vehicle has landed, and an in-flight position located within a portion of the fixed wing structure.

In a further embodiment of the flight vehicle, the inductive charging coil is mounted to a hinged door portion of the fixed wing structure.

BRIEF DESCRIPTION OF THE DRAWINGS

Features, aspects and advantages of the present disclosure will become better understood with regard to the following description and accompanying drawings in which.

DETAILED DESCRIPTION

An autonomous flight vehicle is described that can be used for remote monitoring of areas, such as pipelines or other infrastructure. The autonomous flight vehicle uses a set of thrusters, which may be provided by respective motors and propellers, to provide required thrust for various flight modes. The individual thrusters may be provided by various combinations of different sized motors and propellers to provide the required thrust. The set of thrusters includes a pair of rotary wing flight thrusters that only operate in the rotary wing flight mode. The set of thrusters further includes a pair of combined flight thrusters that operate in both the rotary wing flight mode and the fixed wing flight mode. In order to improve the efficiency of the autonomous flight vehicle in the fixed wing flight mode, the pair of combined flight thrusters are sized to provide the required thrust required for fixed wing flight. While the combined flight thrusters will also operate in the rotary wing flight mode, the generated thrust is not sufficient for the rotary wing flight mode. The pair of rotary wing flight thrusters are sized to provide the additional thrust required for rotary wing flight. The thrust required for rotary wing flight will be more than twice the thrust required for fixed wing flight, and as such, the rotary wing thrusters are sized to provide more than twice the thrust of the combined flight thrusters.

Although the use of different sized thrusters may improve the efficiency of the autonomous flight vehicle, and in particular during the fixed wing flight mode, it can result in mismatched rotational torques between the rotary wing flight thrusters and the combined flight thrusters. The mismatching in rotational torques would result in an inability to adjust the operation point, such as the RPM, for the thrusters while maintaining torque equilibrium while in the rotary wing flight mode, making controlled rotary wing flight difficult or impossible. In order to correct the mismatched torques and achieve controlled rotary wing flight, the rotary wing flight thrusters are mounted with a slight rotation in a plane parallel to the plane the combined flight thrusters are in. While the skewed mounting reduces the total thrust provided by the pair of rotary flight thrusters along the vertical vehicle axis, this enables total torque reduction of the pair of thrusters along the same axis. The angle of rotation or skewing of the thrusters is proportional to a difference in the thrust-torque capabilities between the rotary flight thrusters and the combined flight thrusters as well as the total vehicle weight. Proper determination of the skewing angle, and mounting of the rotary wing flight thrusters, results in an equilibrium point in rotary wing flight mode. The angular skewing of the thruster mounting also accounts for the non-linear relationship between RPM and the resulting force-torque from a motor/prop combination for the different sized thrusters. Using different sized thrusters for the rotary wing flight thrusters and the combined flight thrusters allows the use of more efficient thrusters for the fixed wing flight mode and so the range and endurance can be extended. The skewed mounting of the rotary wing flight thrusters allows different sized thrusters to be used for the rotary wing flight thrusters and the combined flights thrusters while still providing a controllable autonomous flight vehicle capable of rotary wing flight.

Figure 1:
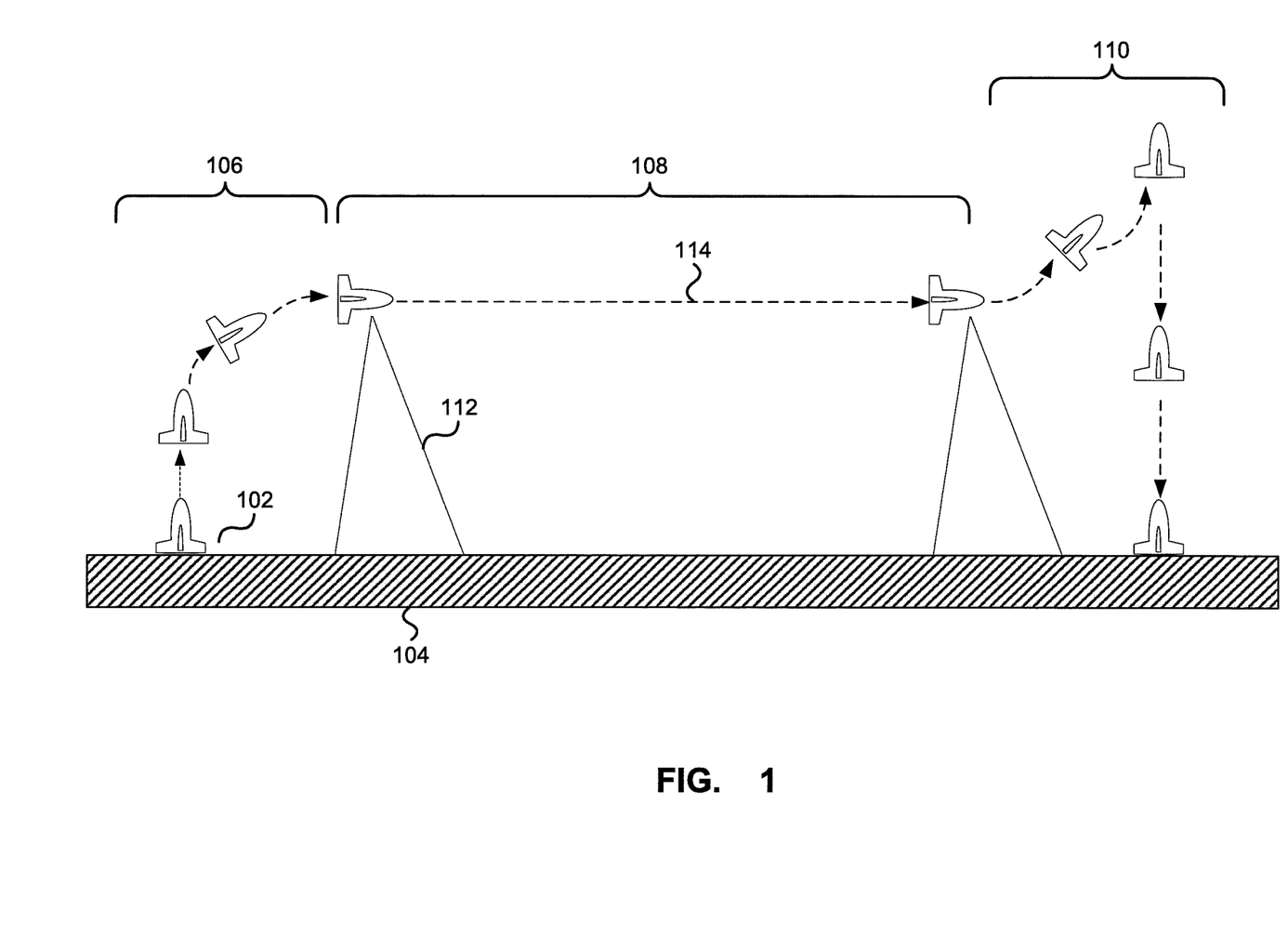
FIG. 1 depicts a flight path of an autonomous flight vehicle.

FIG. 1 depicts a flight path of an autonomous flight vehicle. As depicted, the flight vehicle 102 is capable of a vertical take-off 106 and landing 110 from the ground or a given horizontal surface 104. As described further below with reference to FIGS. 1-9, the flight vehicle 102 comprises a number of battery powered thrusters that all operate to provide the required thrust during the vertical take-off 106 and landing 108 operation, as well as during other rotary wing flight such as hovering. The flight vehicle 102 transitions to fixed wing flight 108 during which, only subset of the thrusters, namely the smaller combined flight thrusters, are used to provide the required forward thrust. Before the completion of the flight, the flight vehicle 102 transitions to rotary wing flight for a landing portion 110 of the flight.

As described above, the flight vehicle 102 may have a pair of larger thrusters, which can be provided by motors and props, that are only used during the takeoff and landing stage, or when the flight vehicle 102 is operating in the rotary wing flight mode. Although the flight vehicle 102 comprises larger thrusters for generating lift during rotary wing flight, they are not sufficient on their own to provide the required amount for rotary wing flight, such as during takeoff, landing and hovering. Accordingly, the pair of smaller combined flight thrusters are also used to provide additional lift during the rotary wing flight mode. As such, when the autonomous flight vehicle operates in the rotary wing flight mode, both sets of thrusters are required. The smaller combined flight thrusters are capable of providing sufficient thrust required for fixed wing flight without having to use the larger rotary wing flight thrusters. Accordingly, during the fixed wing flight portion 108, the pair of larger thrusters required for rotary wing flight are not used and as such power can be conserved for the smaller combined thrusters. Since the combined flight thrusters provide additional thrust to the larger rotary wing flight thrusters, the combined flight thrusters can be optimized to provide the performance required for fixed wing flight. By optimizing the size of the combined flight thrusters for fixed wing flight, the range and/or endurance of the autonomous flight vehicle 102 may be extended while operating in the fixed wing flight portion 108.

The flight vehicle 102 may include a range of possible sensors for detecting or capturing information during a flight. Although a large number of possible sensors may be provided, as an example, the flight vehicle 102 may comprise a camera for capturing an image of the ground, depicted schematically by stippled cone 112. As the flight vehicle 102 flies over a path 114, such as over a pipeline, road, river or other structure or feature being monitored, the sensors may continue to capture data. By extending the range and/or endurance of the flight vehicle 102, it is possible to capture a greater amount of data without having to land the flight vehicle for recharging.

A flight vehicle 200 is described with particular reference to FIGS. 2-9. The flight vehicle 200 described below may be used as the autonomous flight vehicle 102 described above. The flight vehicle 200 comprises a fixed wing structure 202 that is aerodynamically symmetric about its central portion. The fixed wing structure 202 may comprise a pair of wing sections 204a, 204b that are connected to a central body 206. Fixed wing structure 202 is shaped to provide sufficient lift to the flight vehicle during fixed wing flight. The particular shape of the fixed wing structure 202, and in particular the wing sections 204a, 204b may take a number of different shapes well known with the field of wings and aerofoil design.

Figure 2:
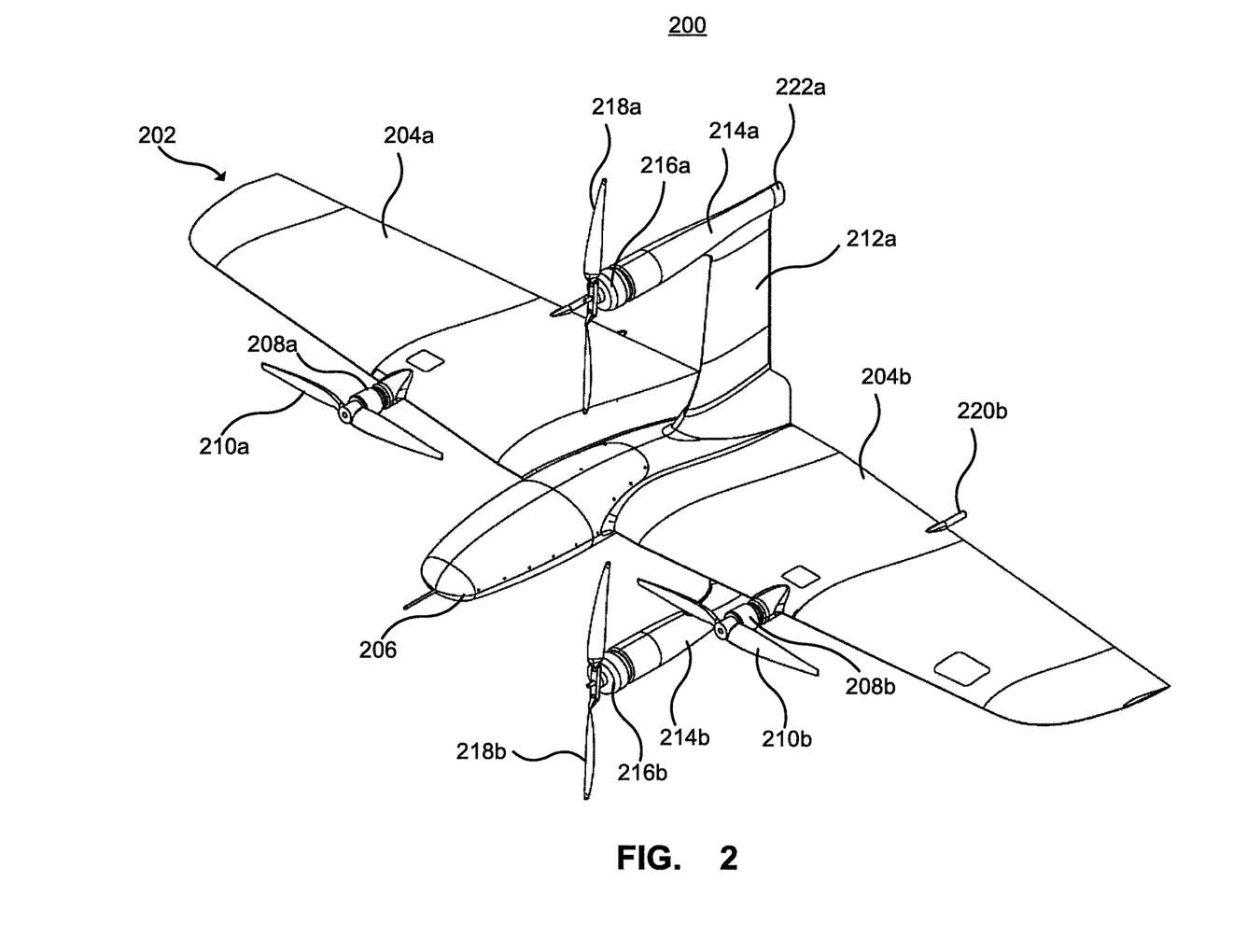
FIG. 2 depicts an isometric view of the autonomous flight vehicle with vertical-flight propellers extended for rotary wing flight.
Figure 3:
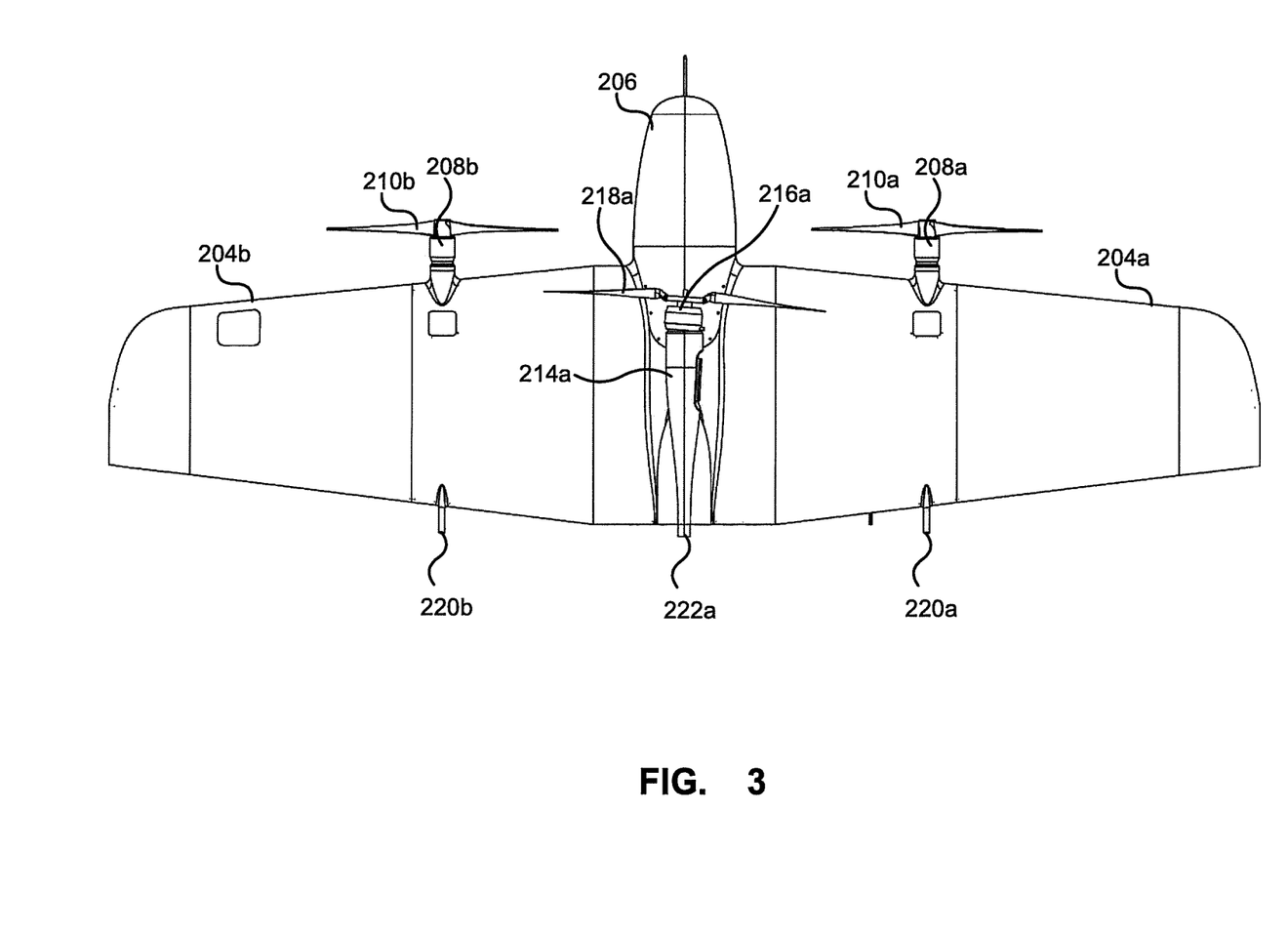
FIG. 3 depicts a top view of the autonomous flight vehicle with vertical-flight propellers extended for rotary wing flight.
Figure 4:
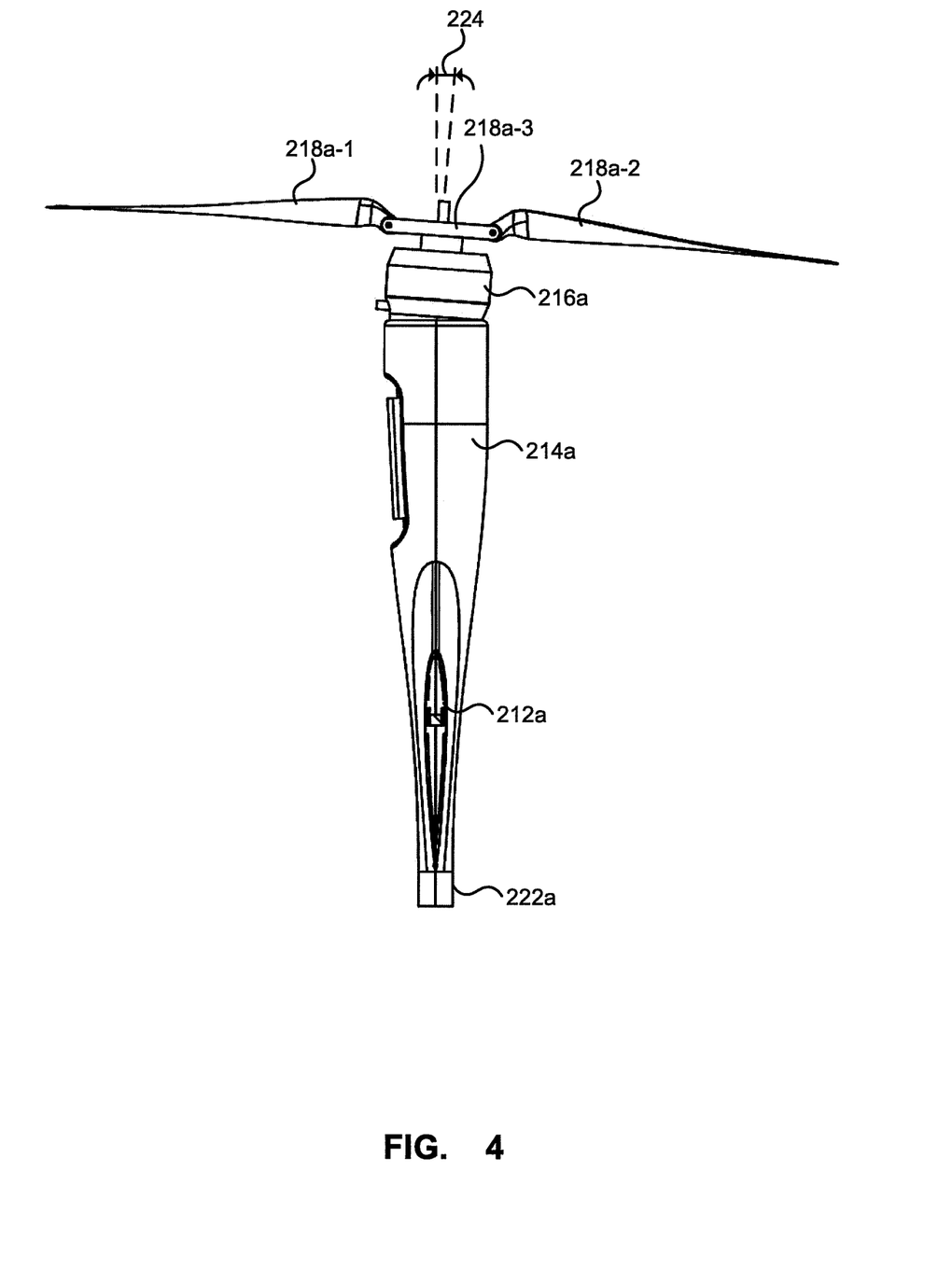
FIG. 4 depicts mounting details of a rotary wing flight thruster.
Figure 5:
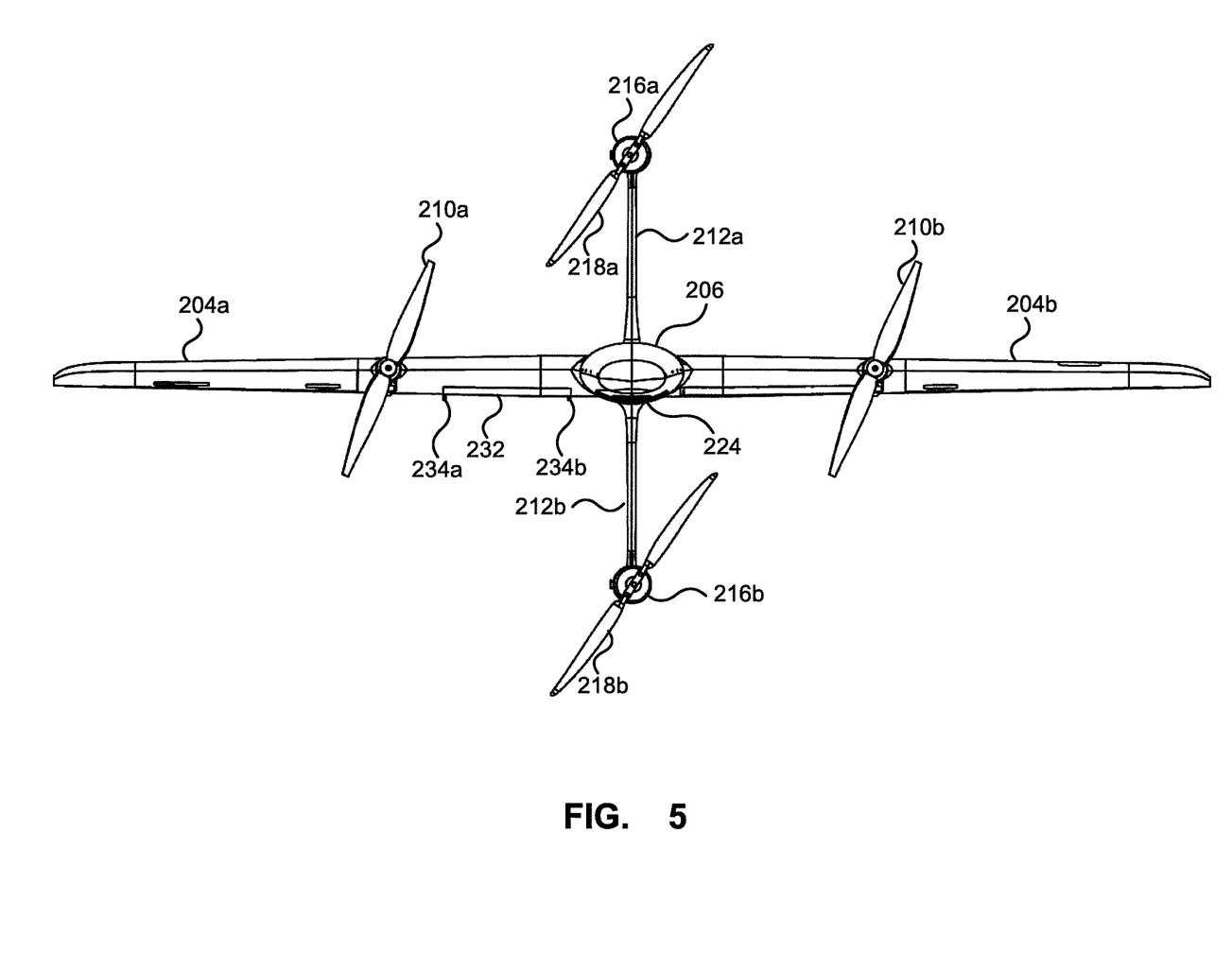
FIG. 5 depicts a front view of the autonomous flight vehicle with vertical-flight propellers extended for rotary wing flight.
Figure 6:
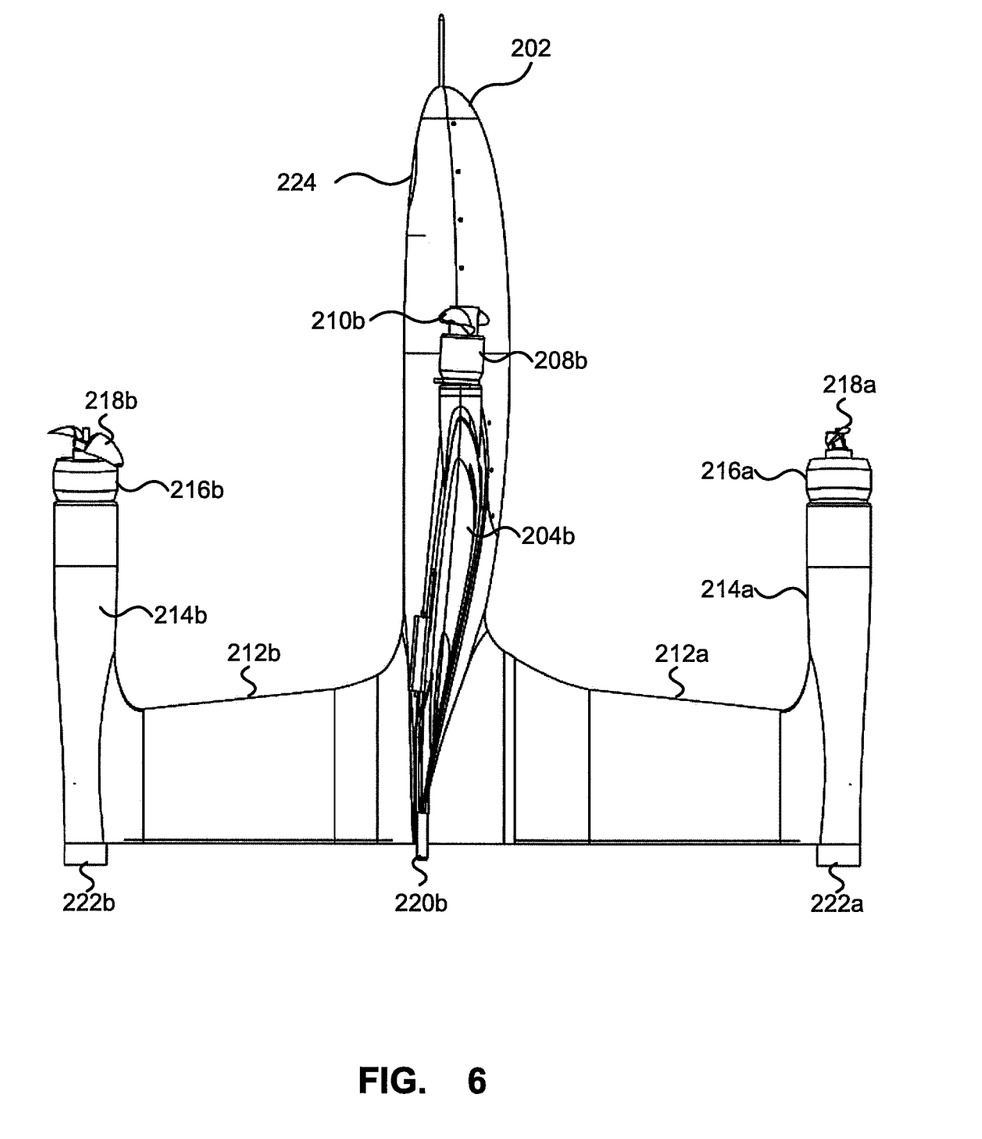
FIG. 6 depicts a side view of the autonomous flight vehicle with rotary wing flight propellers extended for rotary wing flight.

The fixed wing structure 202 has a pair of combined flight thrusters, provided by motors 208a, 208b and propellers 210a, 210b, that are sized to generate the forward thrust required for fixed wing flight. The motors 208a, 208b are mounted to the fixed wing structure such that the respective axes of rotation lie within a plane of the fixed wing structure 202. The required thrust for fixed wing flight of the flight vehicle 200 is smaller than that required for rotary wing flight. As such, optimized selection of thrusters for fixed wing flight results in smaller thrusters. The selection of the thrusters may be based on the required thrust, while accounting for safety margins, and varying operating needs and conditions. The selection of the combined thrusters based only on the fixed wing flight thrust requirements provides an energy efficient flight vehicle, which can extend the range and/or endurance of the flight vehicle 200. While the combined flight motors 208a, 208b and/propellers 210a, 210b are sized to provide sufficient thrust for fixed wing flight, they are also used to provide thrust during rotary wing flight; however do not provide enough thrust on their own required for vertical take-offs, landings or rotary wing flight in general. The larger rotary wing thrusters, comprising rotary wing flight motors 216a, 216b and propellers 218a, 218b, provide the additional thrust required for the rotary wing flight.

The flight vehicle 200 may comprise a rudder 212 (see FIG. 7) extending perpendicularly away from each side of a central portion of the wing structure 202. The rudder comprises an upper arm 212a that extends perpendicularly away from a top side of the central portion of the fixed wing structure 202 and a lower arm 212b extending from a bottom side of the fixed wing structure 202. The terms top side and bottom side of the fixed wing structure 202 are relative to the normal orientation of the flight vehicle in fixed wing flight, with the upper side being the skyward side of the fixed wing structure 202 and the bottom side being the groundward side of the fixed wing structure 202. A mounting structure 214a, 214b is located at respective ends of the rudder 212. That is, a mounting structure 214a is located at an end of the rudder arm 212a away from the top side of the fixed structure 202, and a mounting structure 214b is located at an end of the rudder arm 212b away from the bottom side of the fixed wing structure 202. The mounting structures 214a, 214b provide mounting locations for the rotary wing flight thruster, comprising motors 216a, 216b and propellers 218a, 218b. The rotary wing flight motors 216a, 216b and propellers 218a, 218b are sized to provide sufficient thrust, when operated in co-operation with the fixed wing flight motors 208a, 208b and propellers 210a, 210b, for rotary wing flight allowing the flight vehicle 200 to perform vertical takeoffs, landings as well as hover. The thrust required for rotary wing flight is greater than the required thrust for fixed wing flight and as such, the rotary wing flight motors/propellers are larger, or rather generate more thrust, than the fixed wing flight motors.

The flight vehicle described above may be referred to generally as a tail-sitter as it appears to sit on its tail section during takeoff and landing. The flight vehicle 200 may include support points or landing pads 220a, 220b located on the wing structure 202 as well as support points or landing pads 222a, 222b located on ends of the mounting structures 214a, 214b of the rudder on which the flight vehicle 200 rests. The flight vehicle 200 is capable of taking off and landing vertically using the thrust generated by all of the motors and propellers operating together. In order to conserve power during fixed wing flight, and so extend the range and/or endurance of the flight vehicle, the flight vehicle may only use the combined flight motors during fixed wing flight.

As a result of the use of different sized motors and propellers for rotary wing flight and fixed wing flight, different amounts of torque will be generated from the combined flight thrusters when compared to the torque generated by the rotary wing flight thrusters. This torque imbalance makes control of the flight vehicle during rotary wing flight, and during transitions to fixed wing flight, difficult or impossible. Further, the torque and thrust generated are non-linearly dependent upon the RPM of the motors with different coefficients. Unless accounted for, the torque differences between the different sized thrusters may only be in equilibrium for a fixed operating point, or RPM and as such the flight vehicle cannot be reliably controlled.

In order to mitigate the torque imbalances resulting from the different sized motors and propellers, the flight vehicle 200 skews the mounting of the larger rotary wing flight thrusters, or more particularly the rotary wing flight motors 216a, 216b to reduce the apparent torque generated to be equal to the torque generated by the smaller combined thrusters. As depicted in detail in FIG. 4, the rotary wing flight motors 216a are mounted within the mounting structure 214a such that the motor's rotational axis is skewed, or rotated away from a central plane that the rudder lies within, which may be perpendicular to the plane of the fixed wing structure 202, by an angle 224. The particular angle may be calculated theoretically and then adjusted in practical implementations through trial and error. The theoretical skewing angle $\alpha$ for the two rotary wing flight thrusters when used with two combined flight thrusters can be determined based on the following assumptions and equations.

The motor angular offset is by skewing angle $\alpha$ to overcome the lack of torque equilibrium flexibility in the Z axis when using two sets of different thrusters with one set rotating clockwise and the other set rotating counter clockwise. In developing the equation for determining the skewing angle, the following assumptions are made:

Motor 1 and 2 (i.e. combined flight motors) are a set having the same props and rotates in CCW direction, Motor 3 and 4 (i.e. rotary wing flight motors) are a set having the same props and rotates in CW direction, The distance of motor 3 and 4 to the center of mass is equal ($L_3$, $L_4$), The thrust forces $T_3(z)$, $T_4(z)$ and $T_3(y)$, $T_4(y)$ are projections of the thrust vector onto the z-axis and y-axis, respectively, due to skewed angle installation of motor at an angle $\alpha$ with respect to its axis, The prop wash velocities downstream of thrusters 3 and 4 are $V_3$ and $V_4$ respectively, and affect areas $A_3$ and $A_4$ of the aerodynamic surface (rudder), The lift curve slope of the aerodynamic surfaces is $Cl_\alpha$, The forces F3(y) and F4(y) are side forces generated by the aerodynamic surfaces (i.e. the rudder) under the influence of skewed flow from the thrusters 3 and 4, The forces act a distance $L_3'$ and $L_4'$ to the center of mass. For simplicity, $L_3' \approx L_3$ and $L_4' = L_4$, Torque 1 and 2 (Q1, Q2) are equal in direction and size, Torque 3 and 4 (Q3, Q4) are equal in direction and size, Torque 3 (4) is bigger than torque 1 (2) and their directions are opposite.

According to these assumptions:

$$\|T_1\| = \|T_2\|, \tag{1}$$

$$\|T_3\|=\|T_4\|, \quad (2)$$

$$\|Q_1\|=\|Q_2\|, \quad (3)$$

$$\|Q_3\|=\|Q_4\|, \quad (4)$$

$$\|L_3\|=\|L_4\|, \quad (5)$$

$$\|V_3\|=\|V_4\|, \quad (6)$$

$$\|A_3\|=\|A_4\|, \quad (7)$$

$$\|L_3'\|=\|L_3\|, \quad (8)$$

$$\|L_4\|=\|L_4\|. \quad$$

$$\Sigma T_z = T_1 + T_2 + T_3 \cos\alpha + T_4 \cos\alpha = W \quad (10)$$

$$\Sigma Q_z = \|Q_1\| + \|Q_2\| - \|Q_3\| \cos\alpha - \|Q_4\| \cos\alpha + L_3 \|T_3\| \sin\alpha + L_4 \|T_4\| \sin\alpha - F_3 L_3' - F_4 L_4' = 0 \quad (11)$$

$$\|Q_1\| - \|Q_3\| \cos\alpha + L_3 \|T_3\| \sin\alpha - F_3 L_3 = 0 \quad (12)$$

Where (for small angles i.e. <=10 deg.):

$$F_3 = 0.5\rho V_3^2 C_L A_3 = 0.5\rho V_3^2 C_{L\alpha} \alpha A_3 \approx 0.5\rho V_3^2 C_{L\alpha} \sin\alpha A_3 \quad (13)$$

$$\|Q_3\| \cos\alpha + \sin\alpha (0.5\rho V_3^2 C_{L\alpha} A_3 - \|T_3\|) L_3 = \|Q_1\| \quad (14)$$

Substitute:

$$\|Q_3\| = \sin\beta; \quad (15)$$

$$(0.5\rho V_3^2 C_{L\alpha} A_3 - \|T_3\|) L_3 = \cos\beta; \quad (16)$$

$$\tan\beta = \frac{\|Q_3\|}{(0.5\rho V_3^2 C_{L\alpha} A_3 - \|T_3\|) L_3} \quad (17)$$

Then:

$$\sin\beta\cos\alpha + \cos\beta\sin\alpha = \|Q_1\| \quad (18)$$

$$\sin(\alpha + \beta) = \|Q_1\| \quad (19)$$

$$\alpha = \arcsin\|Q_1\| - \beta \quad (20)$$

$$\alpha = \arcsin\|Q_1\| - \arctan\frac{\|Q_3\|}{(0.5\rho V_3^2 C_{L\alpha} A_3 - \|T_3\|) L_3} \quad (21)$$

The theoretical skewing angle, a, can be determined as described above and used as an initial mounting position for the rotary wing flight thrusters. The theoretically determined skewing angle may be adjusted by trial and error in order to arrive at an appropriate value for the flight vehicle.

Figure 7:
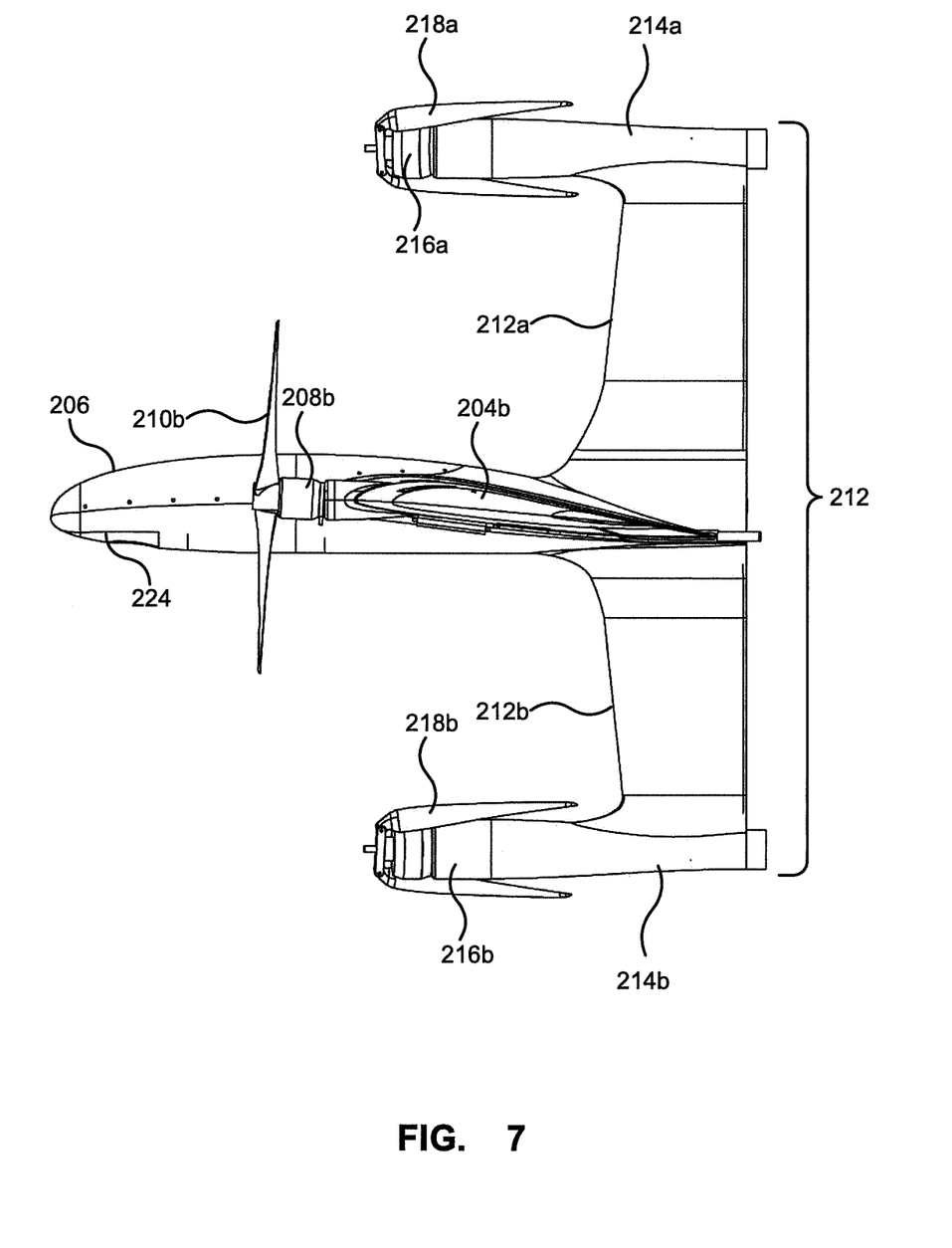
FIG. 7 depicts a side view of the autonomous flight vehicle with rotary wing flight propellers collapsed for fixed wing flight.

In addition to skewing the mounting of the rotary wing flight motors, the mounting structures 214a, 214b may also mount the motors away from the rudder by a sufficient distance to allow the propellers to fold when not in use. This is depicted in FIG. 7. As depicted, the mounting structures 214a, 214b mount the motors 216a, 216b far enough away from the respective rudder arms 212a, 212 so as to allow the propellers 218a, to fold without contacting the rudder arms. In order to allow the propellers to fold as depicted, the individual blades 218a-1, 218a-2 (see FIG. 4) may be pivotally connected to a central portion 218a-3 that is connected to the motor 216a. The propellers may fold inward, during fixed wing flight since the thrust provided by the propellers is only required during rotary wing flight.

Allowing the propellers to fold in reduces the drag and as such improves the efficiency and range of the flight vehicle.

Figure 8:
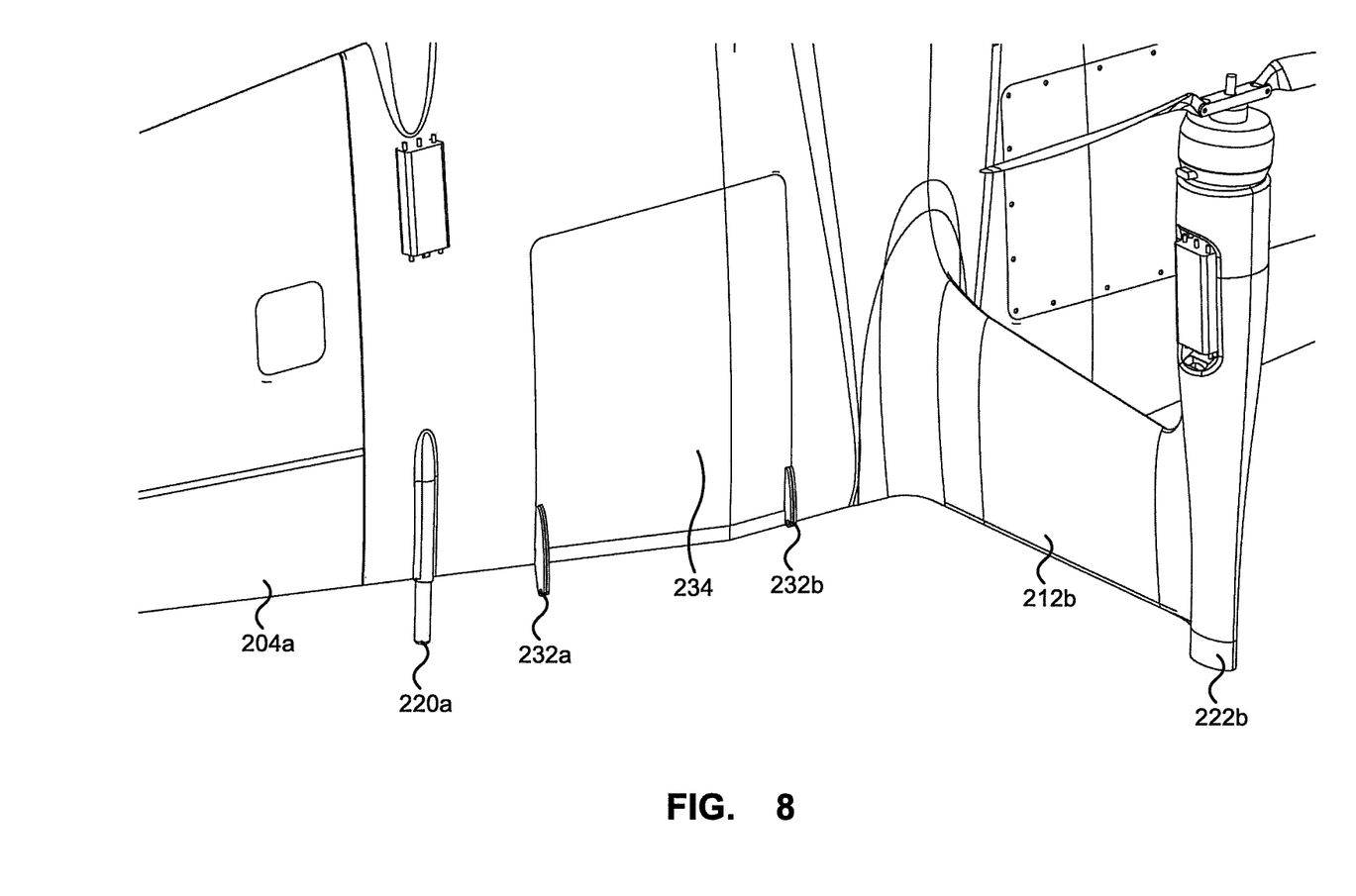
FIG. 8 depicts details of a pivotal inductive charging pad in a closed position.
Figure 9:
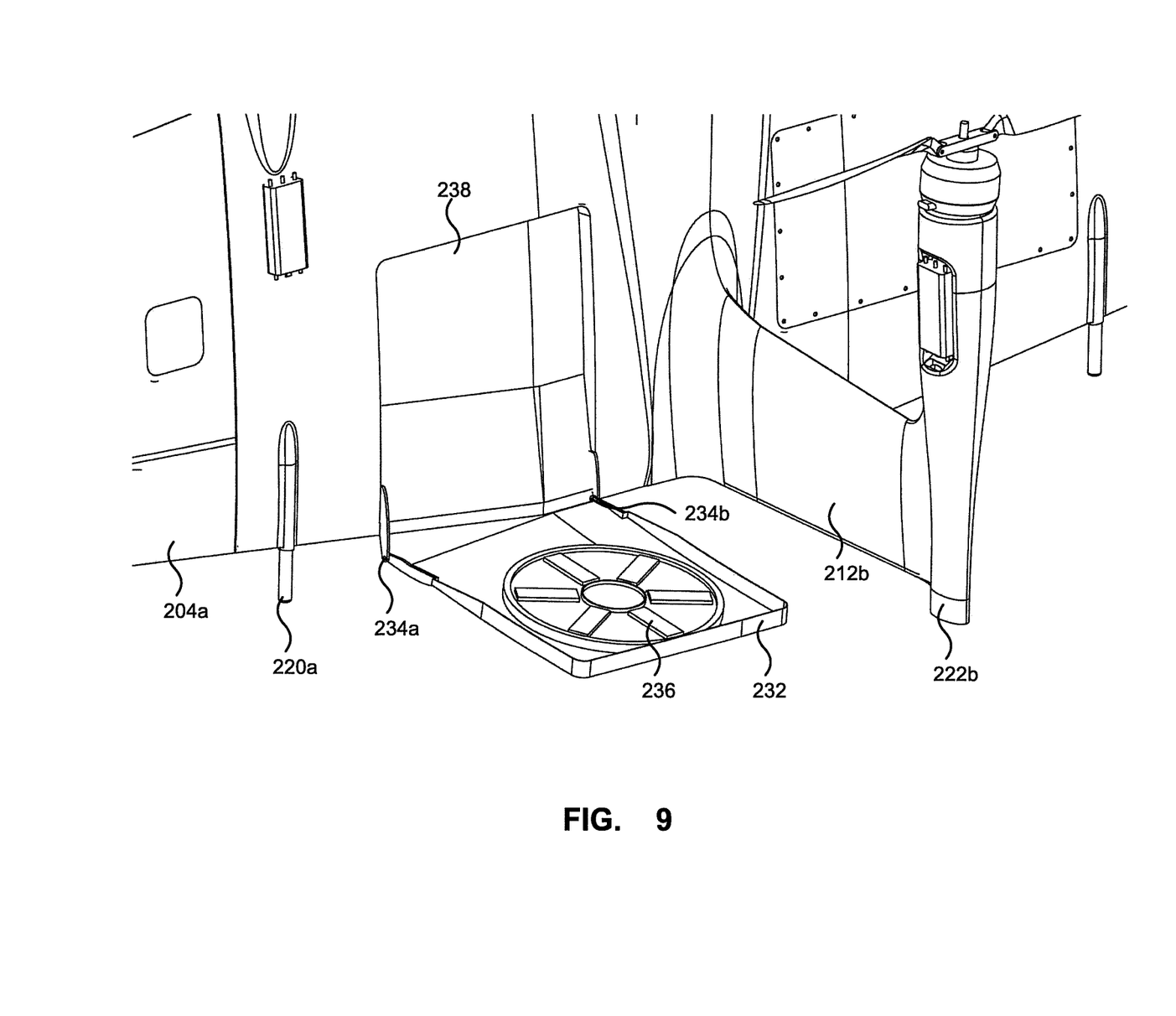
FIG. 9 depicts details of the pivotal inductive charging pad in an opened position.

The flight vehicle 200 is described as using battery powered motors. In order to facilitate charging the flight vehicle in an autonomous fashion, the flight vehicle may comprise an inductive charging coil. For tail sitter applications, there may be limited surfaces for locating the charging coil in a suitable position for charging. As depicted in FIGS. 8 and 9, a charging coil 236 may be pivotally mounted to the fixed wing flight wing structure. The charging coil may be mounted to a tray portion 234 of the wing structure 202 that is connected by respective hinges 232a, 232b. The hinged tray allows the charging coil 236 to be stored within a cavity 238 of the wing structure 202 during flight, which provides an aerodynamic profile, while rotating to a charging position that is substantially horizontal, or parallel to a corresponding charging coil located in landing platform for charging the flight vehicle. As depicted in FIGS. 8 and 9, the hinged tray 232 can move between a charging position parallel to a landing surface on which the autonomous flight vehicle has landed (depicted in FIG. 9), and an in-flight position located within a portion of the forward-flight wing structure (depicted in FIG. 8). Although described with reference to the flight vehicle 200 that includes a skewed mounting of the vertical lift motors, the hinged charging coil tray may be advantageously used with other tail sitter flight vehicles, with or without differently sized motors and propellers.

Figure 10:
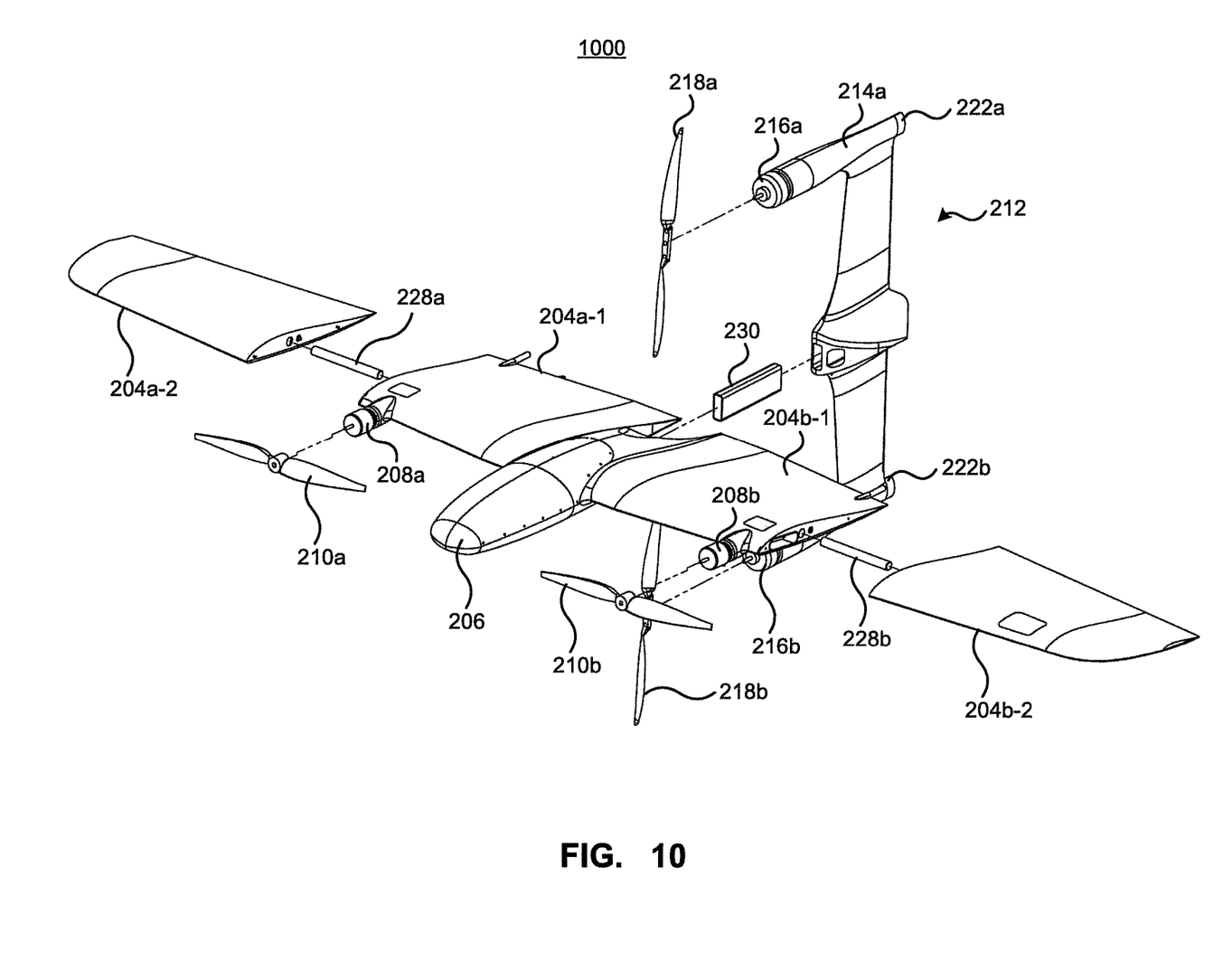
FIG. 10 depicts an exploded view of a collapsible autonomous flight vehicle.

FIG. 10 depicts an exploded view of a collapsible autonomous flight vehicle. The flight vehicle 1000 may be assembled from the individual components and may be substantially the same as the flight vehicle 200 when assembled. As depicted, the wing sections 204a, 204b of the flight vehicle 200 may be assembled from a removable wing section 204a-1, 204b-1 that are removal attached to wing sections 204a-2, 204b-2 that are connected to the central body 206. A connecting member 228a, 228 may be used to strengthen the connection between the wing sections 204a-1, 204b-1 and 204a-2, 204b-2. As depicted the connecting members 228a, 228b for connecting the wing sections together may be provided by a rod or other similar structure that can slide into both sides of the wing connection. The rudder 212 may also be detachable from the central body 206. In order to strengthen the rudder connection a connecting member 230 may be used. The connecting member 230 may be received with in a correspondingly shaped cavity 226 in the rudder 212. The connecting member 230 and cavity may have a rectangular cross section in order to help prevent twisting of connection between the rudder 212 and the central body 206. The wing sections 204a-1, 204b-1 and the rudder may be detached in order to provide a more compact configuration for transporting the flight vehicle 1000.

Although specific embodiments are described herein, it will be appreciated that modifications may be made to the embodiments without departing from the scope of the current teachings. Accordingly, the scope of the appended claims should not be limited by the specific embodiments set forth, but should be given the broadest interpretation consistent with the teachings of the description as a whole.

What is claimed is:

1. A flight vehicle capable of rotary wing flight and fixed wing flight, the flight vehicle comprising:
    a fixed wing structure configured to generate lift during fixed wing flight of the flight vehicle;
    a pair of combined flight thrusters mounted on opposites sides of a central portion of the fixed wing structure and configured to generate thrust during both fixed wing flight and rotary wing flight, rotational axes of each of the combined flight thrusters lying within a first plane; and a pair of rotary wing flight thrusters, each of the rotary wing flight thrusters mounted at a fixed angle skewed away from a second plane perpendicular to the first plane and parallel to the rotational axis of at least one of the combined flight thrusters, the pair of rotary wing flight thrusters configured for providing thrust during rotary wing flight, the pair of rotary wing flight thrusters capable of providing greater thrust than the pair of combined flight thrusters.

2. The flight vehicle of claim 1, wherein the fixed wing structure is symmetrical about the central portion in the shape of the aerodynamic surfaces and comprises:

a central body;

a first wing connected to a first side of the central body; and a second wing connected to a second side of the central body.

3. The flight vehicle of claim 2, further comprising a pair of rudder arms each extending perpendicularly away from a respective side of the central body with a respective one of the rotary wing flight thrusters mounted at an end of the rudder arm.

4. The flight vehicle of claim 3, wherein each of the first wing, second wing and rudder arms are removably connected to the central body.

5. The flight vehicle of claim 3, further comprising support points located on the wing structure and the rudder arms for supporting the flight vehicle for take-offs and landings.

6. The flight vehicle of claim 1, wherein each of the pair of combined flight thrusters comprise respective motors and propellers for generating the required thrust and each of the pair of rotary wing flight thrusters comprise respective motors and propellers for generating the required thrust.

7. The flight vehicle of claim 6, wherein propellers of the rotary wing flight thrusters motors are pivotally connected to the respective motors to allow the propellers to fold toward the motors during fixed wing flight.

8. The flight vehicle of claim 1, further comprising flight control electronics for autonomously controlling flight of the flight vehicle.

9. The flight vehicle of claim 1, further comprising one or more onboard sensors for capturing data during fixed wing flight.

10. The flight vehicle of claim 1, wherein all of the combined flight thrusters and rotary wing flight thrusters are battery-powered.

11. The flight vehicle of claim 10, further comprising:

a rechargeable battery pack; and charging circuitry for re-charging the rechargeable battery pack.

12. The flight vehicle of claim 11, wherein the charging circuitry comprises an inductive charging coil.

13. The flight vehicle of claim 12, wherein the inductive charging coil is pivotally mounted to the fixed wing structure to allow the charging coil to move between a charging position parallel to a landing surface on which the flight vehicle has landed, and an in-flight position located within a portion of the fixed wing structure.

14. The flight vehicle of claim 12, wherein the inductive charging coil is mounted to a hinged door portion of the fixed wing structure.

* * * * *